United States Patent

Matsubara

[11] Patent Number: 5,870,939
[45] Date of Patent: Feb. 16, 1999

[54] CIRCULAR SAW

[75] Inventor: Kouji Matsubara, Anjo, Japan

[73] Assignee: Makita Corporation, Aichi-ken, Japan

[21] Appl. No.: 773,314

[22] Filed: Dec. 24, 1996

[30] Foreign Application Priority Data

Feb. 5, 1996 [JP] Japan ................................. 8-018997

[51] Int. Cl.[6] ................................ B26D 1/14; B27B 5/20
[52] U.S. Cl. ...................... 83/471.3; 83/477.1; 83/486.1; 83/581
[58] Field of Search ............................... 83/477.1, 486.1, 83/471.3, 581, 490, 698.31, 698.71, 699.31, 699.41, 699.51, 699.61, 485

[56] References Cited

U.S. PATENT DOCUMENTS

| | | | |
|---|---|---|---|
| 3,104,687 | 9/1963 | Field | 83/486.1 |
| 3,603,360 | 9/1971 | Botefuhr | 83/486.1 X |
| 4,181,057 | 1/1980 | Bassett | 83/486.1 |
| 4,800,793 | 1/1989 | McCord, Sr. | 83/486.1 X |
| 4,869,142 | 9/1989 | Sato et al. | 83/471.3 X |
| 5,054,352 | 10/1991 | Fushiya et al. | |
| 5,060,548 | 10/1991 | Sato et al. | |
| 5,207,141 | 5/1993 | Dehari | 83/486.1 X |
| 5,241,888 | 9/1993 | Chen | 83/486.1 X |
| 5,249,496 | 10/1993 | Hirsch et al. | 83/477.1 X |
| 5,383,382 | 1/1995 | Garuglieri et al. | 83/471.3 |
| 5,404,779 | 4/1995 | Break | 83/486.1 X |
| 5,595,124 | 1/1997 | Wixey et al. | 83/471.3 X |

FOREIGN PATENT DOCUMENTS 54-39692  3/1979  Japan .
4-44321  10/1992  Japan .

*Primary Examiner*—Eugenia Jones
*Assistant Examiner*—Charles Goodman
*Attorney, Agent, or Firm*—Dennison, Meserole, Pollack & Scheiner

[57] ABSTRACT

A circular saw has a table for placing a work to be cut thereon and has a saw unit slidably supported on the table by means of a slide mechanism. A slide stopper mechanism is adapted for fixing the saw unit in position in a sliding direction and has a slide stopper operation member disposed adjacent a front portion of the table on the side of an operator who operates the saw unit.

20 Claims, 8 Drawing Sheets

CIRCULAR SAW

BACKGROUND OF THE INVENTION

1. Field of the Invention

The present invention relates to a circular saw, and more particularly to a circular saw which has a table, a saw unit having a saw blade and slidably mounted on the table, and a slide stopper mechanism for fixing the saw unit in position in a sliding direction relative to the table.

2. Description of the Prior Art

A conventional circular saw is disclosed in Japanese Utility Model Publication No. 4-44321 and includes a stopper mechanism which has an operation knob adapted to be rotated by an operator. The operation knob is disposed on a rear side of a saw unit which is the side opposite to a front side where the operator is positioned for operating the saw unit. With this arrangement, in order to operate the operation knob, the operator must reach out his hand to the rear side of the saw unit and grope for the operation knob to grasp the same. Therefore, the conventional circular saw has a problem in its operability. In particular, since the operation knob is positioned on the rear side of the saw unit, the operator feels difficulty in getting a view of the operation knob. In addition, in some cases, the knob is covered by a dust absorbing bag which is normally mounted on the rear portion of the saw unit, so that the knob is difficult to be operated in this respect.

Further, in case of a circular saw which has a saw unit slidably movable relative to a turntable and rotatable with the turntable, the position of an operation knob is changed for each rotational operation of the turntable. Therefore, the operator must grope for the operation knob in a further unreliable manner. Otherwise, the operator must move from the position on the front side of the saw unit to a different position for visually recognize the position of the knob before he operates the knob. The conventional circular saw has a problem in its operability also in this respect.

In another aspect, with a conventional circular saw having a turntable rotatable with a saw unit, a rotation stopper mechanism is normally provided for fixing the rotational position of the turntable. Japanese Laid-Open Utility Model Publication No. 54-39692 discloses a circular saw having a rotation lock mechanism. The rotation lock mechanism includes a lock pin mounted on a front side of the turntable and includes lock holes formed in a base on which the turntable is rotatably supported. The lock pin is biased by a spring in a direction toward the base for insertion into any one of the lock holes. The lock pin is removed from the corresponding lock hole when an operator pulls the lock pin forwardly toward himself, so that the turntable is brought to be free to rotate. When the operator releases the lock pin with the turntable positioned in a desired position, the lock pin is brought to be inserted into the corresponding lock hole by the biasing force of the spring, so that the turntable is fixed in position in the rotational direction.

However, the operation for releasing the lock pin is rather difficult for the operator since he must pull the lock pin toward himself and since the pulling operation must be made against the biasing force of the spring. The conventional circular saw has a problem in its operability also in this respect.

SUMMARY OF THE INVENTION

It is, accordingly, an object of the present invention to provide a circular saw having a slide stopper mechanism which is excellent in operability.

It is another object of the present invention to provide a circular saw having a slide stopper mechanism which is simple in construction.

It is still another object of the present invention to provide a circular saw having a slide stopper mechanism and a rotation stopper mechanism which do not require a large space for mounting on the circular saw.

It is a further object of the present invention to provide a circular saw having a slide stopper mechanism, a rotation stopper mechanism, and a rotation lock mechanism which have operation members concentrated on the front side of the saw unit.

It is a still further object of the present invention to provide a circular saw having a rotation lock mechanism which is excellent in operability.

It is another object of the present invention to provide a circular saw having a rotation lock mechanism which is simple in operation.

It is a further object of the present invention to provide a circular saw having a rotation lock mechanism with a rolling member which is mounted on an operation member and which can be easily incorporated without accompanying increase in manufacturing costs and assembling costs while permitting smooth rotational movement of the rotation lock operation member.

According to the present invention, in a circular saw having a table for placing a work to be cut thereon and having a saw unit slidably supported on the table by means of a slide mechanism, the improvement comprising:

a slide stopper mechanism adapted for fixing the saw unit in position in a sliding direction and having a slide stopper operation member disposed adjacent a front portion of the table on the side of an operator who operates the saw unit.

The slide mechanism may include a slide support member fixed to the saw unit and slidably supported on the table. A slide stopper member is actuated through operation of the slide stopper operation member and is movable between a fixing position for pressing on the slide support member and a releasing position for not pressing on the slide support member. A slide stopper rod is interposed between the slide stopper member and the slide stopper operation member and is movable relative to the table in an axial direction. The slide stopper member is pivoted between the fixing position and the releasing position when the slide stopper operation member is rotated by the operator.

In case of a circular saw having a base for rotatably supporting the table, and a rotation stopper mechanism may be provided for fixing a rotational position of the table relative to the base. The rotation stopper mechanism has a rotation stopper operation member disposed adjacent the front portion of the table and adjacent the slide stopper operation member. The rotation stopper mechanism further includes a rotation stopper member adapted to be pressed on the base, and a rotation stopper rod axially slidably movable relative to the table. The rotation stopper rod is slidably received within the slide stopper rod.

A rotation lock mechanism may be provided for fixing the table in any of plurality of predetermined rotational positions. The rotation lock mechanism has a rotation lock operation member disposed adjacent the front portion of the table and adjacent both the slide stopper operation member and the rotation stopper operation member. The rotation lock mechanism further includes a rotation lock rod insertable into any of lock holes formed in the base.

A motion conversion device is provided between the rotation lock operation member and the front portion of the table for converting the rotation of the rotation lock operation member into the axial movement of the rotation lock rod. The motion conversion device includes an inclined surface and an abutting portion. The inclined surface is formed on the front portion of the table and is inclined relative to the axis of the rotation lock rod. The abutting portion is provided on the rotation lock operation member for abutment on the inclined surface, so that the abutting portion varies its abutting position along the inclined surface when the rotation lock operation member is rotated by the operator.

A stopper surface may be formed in continuity with one end of the inclined surface for abutment of the rotation lock operation member in its rotational direction, so that the rotation lock operation member is prevented from being rotated further when the rotation lock rod is completely removed from the lock holes.

In place of the stopper surface, an unlock holding surface may be formed in continuity with one end of the inclined surface. The unlock holding surface extends substantially perpendicular to the rotational axis of the rotation lock operation member for preventing the rotation lock operation member from returning in an opposite direction when the rotation lock rod is completely removed from the lock holes.

The abutting portion may abut on the inclined surface by means of a rolling member such as a coil spring fitted on the abutting portion for smooth movement of the rotation lock operation member.

The invention will become more apparent from the appended claims and the description as it proceeds in connection with the drawings.

DETAILED DESCRIPTION OF THE PREFERRED EMBODIMENTS

An embodiment of the present invention will now be explained with reference to the drawings.

Figure 1:
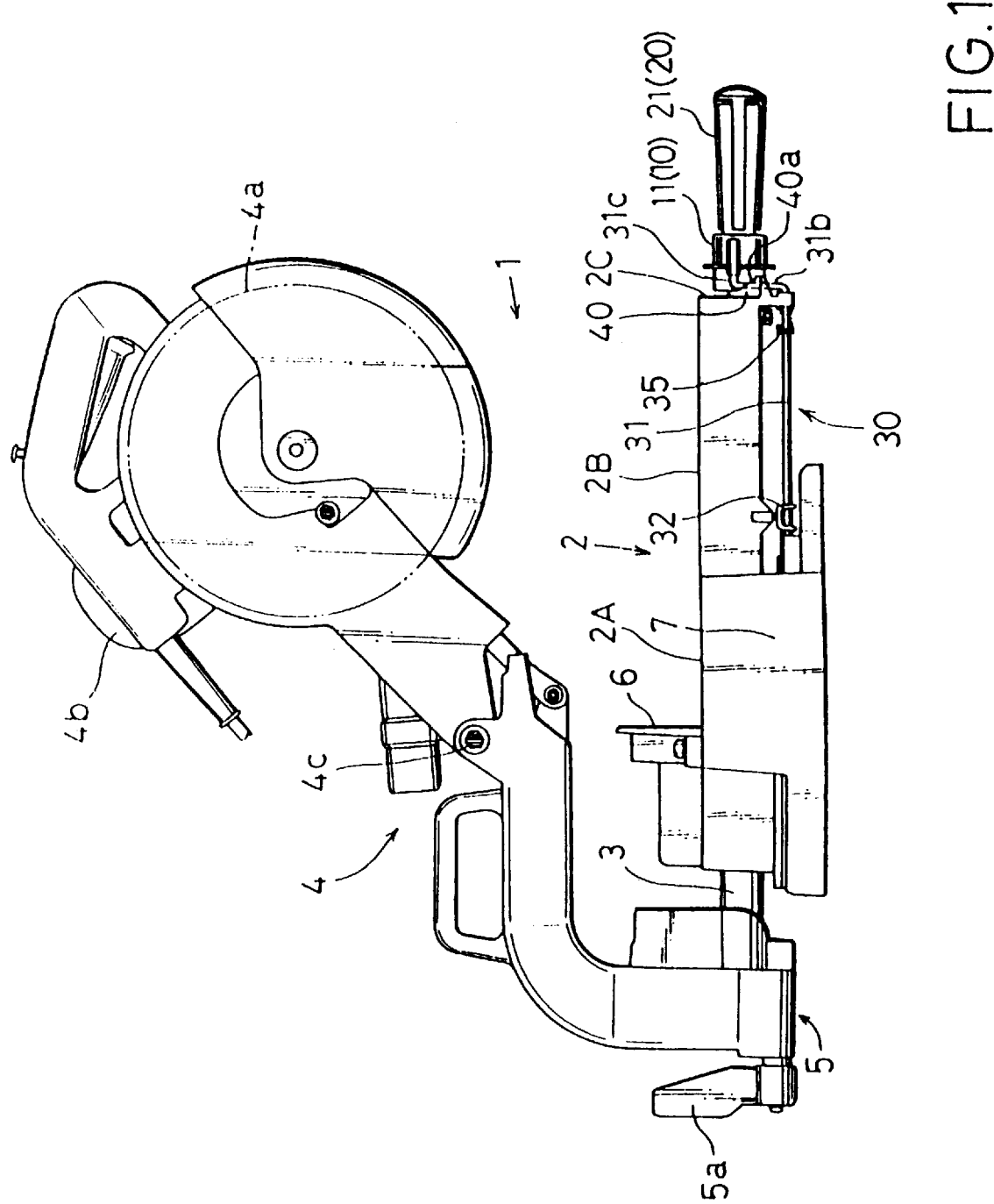
FIG. 1 is a side view of a slide-type circular saw according to an embodiment of the present invention.

Referring to FIG. 1, there is shown the overall construction of a slide-type circular saw 1. The circular saw 1 includes a base 7 on which a turntable 2 is rotatably mounted. A miter saw unit 4 is mounted on a rear portion (left side end as viewed in FIG. 1) of the turntable 2 by means of a pair of slide bars 3, so that the miter saw unit 4 is slidably movable relative to the turntable 2 in forward and rearward directions (right and left directions as viewed in FIG. 1).

The miter saw unit 4 will now be explained in brief. The miter saw unit 4 includes a circular saw blade 4a and an electric motor 4b for rotatably driving the circular saw 4a. The miter saw unit 4 is supported on the slide bars 3 by means of a laterally pivotal support portion 5, so that the miter saw unit 4 can be pivoted laterally (in a direction perpendicular to the sheet of FIG. 1) within a predetermined range when an operator releases a fixing lever 5a. The saw blade 4a as well as the miter saw unit 4 can be fixed at a desired laterally pivoted position by tightening the fixing lever 5a, so that an oblique cutting operation can be performed. In addition, a fence 6 for determining a position of a work to be cut is mounted on a rear upper portion of the turntable 2. Further, the miter saw unit 4 is vertically pivotally mounted on the laterally pivotal support portion 5 by means of a support pin 4c.

Figure 2:
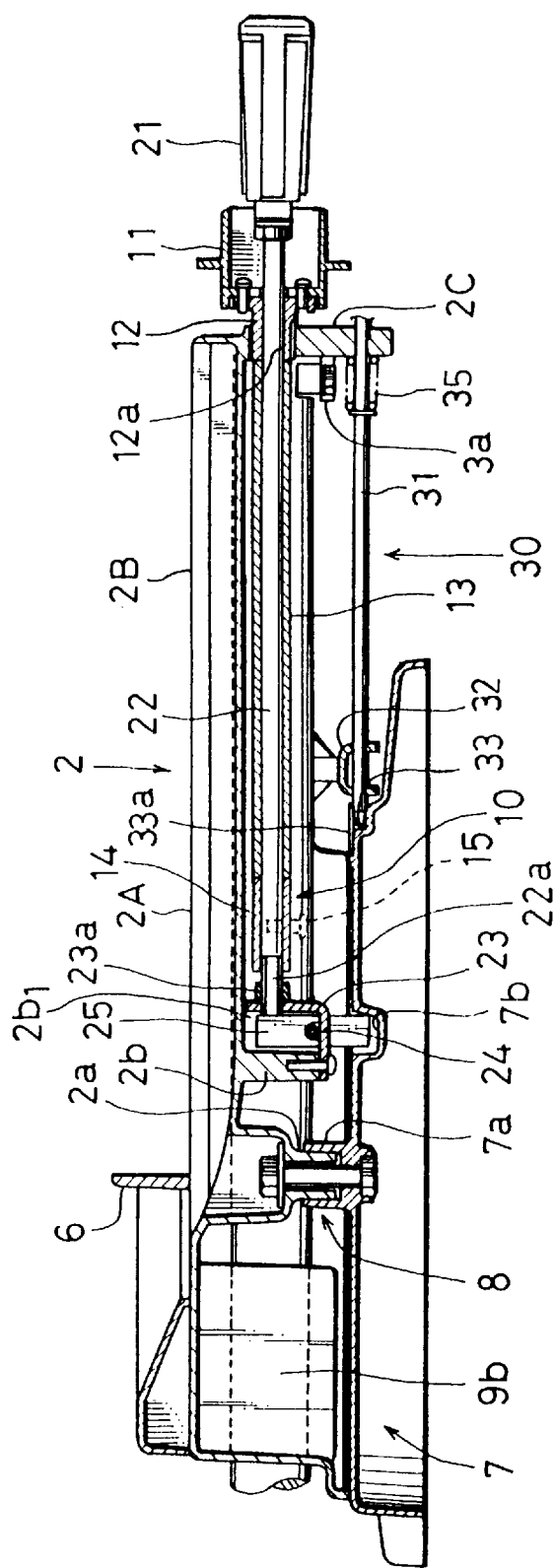
FIG. 2 is a vertical sectional view of a base and a turntable of the circular saw.
Figure 3:
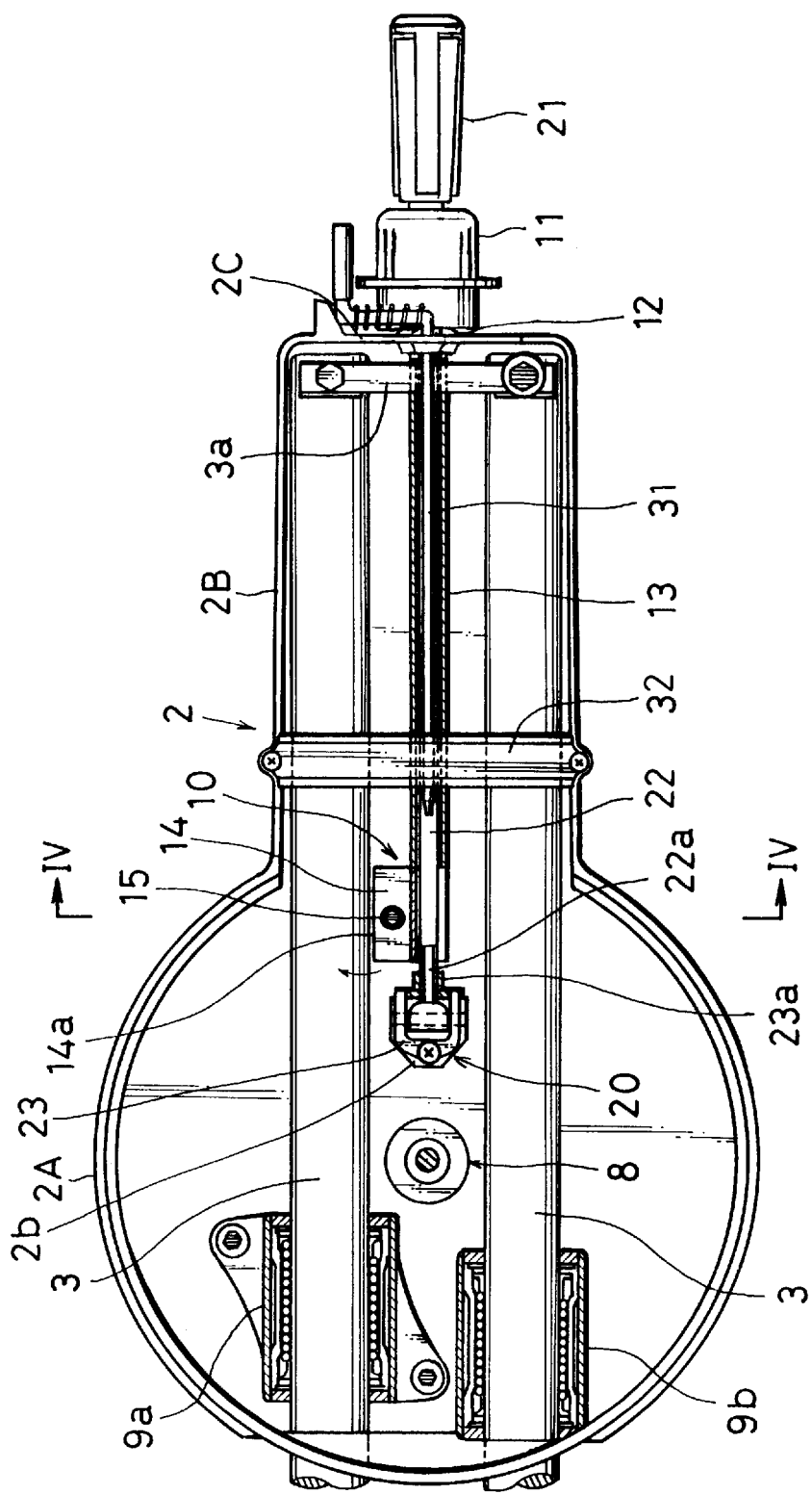
FIG. 3 is a bottom view of the circular saw.

As will be best seen from FIGS. 2 and 3, the turntable 2 has a protrusion 2a which is rotatably received within an axial hole 7a formed in a boss portion 8 of the base 7, so that the turntable 2 is rotatable relative to the base 7 within a horizontal plane. As shown in FIG. 3, the turntable 2 includes a circular plate portion 2A and an extension 2B extending forwardly from a front portion (right side portion as viewed in FIG. 3). The slide bars 3 are mounted below the circular plate portion 2A by means of a pair of bearings 9a and 9b which are mounted on a rear portion of a lower surface of the circular plate portion 2A, so that the slide bars 3 are positioned in parallel to each other and are slidably movable relative to the circular plate portion 2A.

Here, the position of one bearing 9a is adjustable relative to the circular plate portion 2A, so that the slide bars 3 can be easily determined to be positioned in parallel to each other. The slide bars 3 are connected to each other by two connecting bars 3a at their frontmost positions and at their central positions in the axial direction, respectively, so that the slide bars 3 are held to be spaced from each other by a predetermined distance. The connecting bar 3a at the central position is not shown in the drawings for convenience of illustration.

A slide stopper mechanism 10 and a rotation stopper mechanism 20 are positioned below the turntable 2. The slide stopper mechanism 10 is operable to fix the miter saw unit 4 in position in its sliding direction, and the rotation stopper mechanism 20 is operable to fix the miter saw unit 4 as well as the turntable 2 in position in the rotational direction. The extension 2B of the turntable 2 includes a front wall 2C where a slide stopper operation member 11 and a rotation stopper operation member 21 are positioned. The slide stopper operation member 11 and the rotation stopper operation member 21 are operable to be rotated independently of each other.

The slide stopper operation member 11 has a substantially cylindrical configuration and has a tubular screw part 12 fixed thereto. The screw part 12 is threadably engaged with the front wall 2C and has an axial hole 12a formed therein. A rotation stopper rod 22 extends through the slide stopper operation member 11 and through the axial hole 12a of the screw part 12. The rotation stopper rod 22 has a front end (right side end as viewed in FIG. 2) on which the rotation stopper operation member 21 is mounted, so that the slide stopper operation member 11 and the rotation stopper operation member 21 are positioned coaxially with each other and can be rotatable independently of each other as described above.

A sleeve-like slide stopper rod 13 is axially movably fitted on the rotation stopper rod 22. The slide stopper rod 13 has a front end on which the screw part 12 is in abutment, so that the slide stopper rod 13 is moved axially relative to the rotation stopper rod 22 when the screw part 12 is rotated through the rotational operation of the slide stopper operation member 11.

Figure 4:
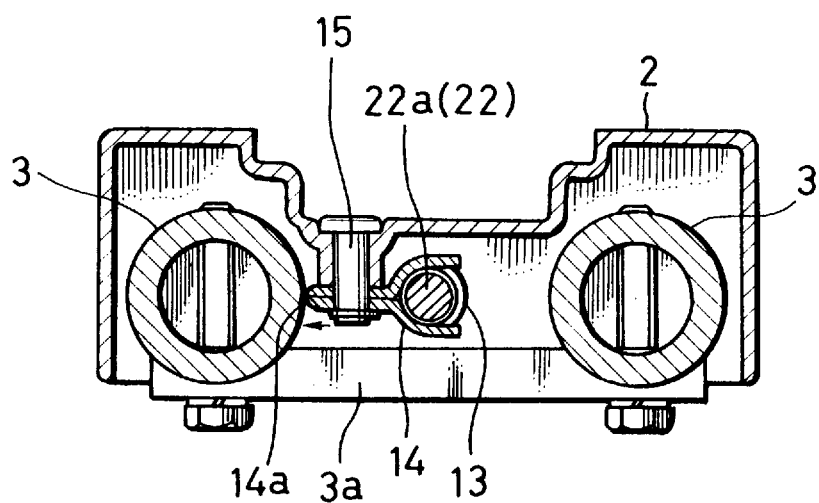
FIG. 4 is a sectional view taken along line IV—IV in FIG. 3.

As shown in FIG. 4, a slide stopper member 14 is horizontally pivotally mounted on the base 7 by means of a support pin 15. The slide stopper member 14 has a substantially Y-shaped configuration in section and has a pair of bifurcated parts which extend to receive the rotation stopper rod 22 therebetween. The slide stopper rod 13 has a rear end which is in abutment on the front side of the bifurcated parts of the slide stopper member 14.

With the slide stopper mechanism 10 as described above, when the slide stopper rod 13 is moved rearwardly (leftwardly as viewed in FIG. 3) through the rotational operation of the slide stopper operation member 11 in one direction, the slide stopper member 14 is pivoted in a clockwise direction in FIG. 3 about the support pin 15. A rear corner portion 14a of the slide stopper member 14 is therefore brought to be pressed on one of the slide bars 3, so that the slide bars 3 are prevented from being moved in the axial direction. This means that the miter saw unit 4 is prevented from moving relative to the turntable 2 in the sliding direction.

On the other hand, when the slide stopper operation member 11 is rotated in a reverse direction, the screw part 12 is moved forwardly (rightwardly as viewed in FIG. 2) relative to the front wall 2C. The slide stopper member 14 is therefore released not to be pressed on the slide bar 3, so that the miter saw unit 4 as well as the slide bars 3 can be moved in the sliding direction.

A threaded portion 22a is formed on the other end of the rotation stopper rod 22 and is in engagement with a nut part 23a which is formed on a bracket 23. The bracket 23 is mounted on a rib 2b of the turntable 2 and is positioned below the turntable 2. A rotation stopper member 25 is mounted on the bracket 23 by means of a support pin 24, so that the rotation stopper member 25 is pivotable in forward and rearward directions (right and left directions in FIG. 2). The threaded portion 22a of the rotation stopper rod 22 is in abutment on the upper part of the rotation stopper member 25 above the support pin 24. On the other hand, the lower part of the rotation stopper member 25 below the support pin 24 extends into a stopper recess 7b formed on an upper surface of the base 7. The stopper recess 7b has a configuration of a part of a circle about the boss portion 8 which defines the limits of rotation. Both ends of the support pin 24 are rotatably received between a pair of laterally confronting wall parts 2b1 and parts of the bracket 23 vertically confronting the wall parts 2b1, so that the support pin 24 is prevented from being removed from the bracket 23.

With the rotation stopper mechanism 20 as described above, when the rotation stopper operation member 21 is rotated in one direction, the rotation stopper rod 22 rotated together with the rotation stopper operation member 21, so that the threaded part 22a formed on the rear end of the rotation stopper rod 22 is screwed into the nut part 23a of the bracket 23 and pushes the upper part of the rotation stopper member 25. The rotation stopper member 25 is therefore pivoted about the support pin 24 in a counterclockwise direction in FIG. 2, so that the lower end of the rotation stopper member 25 is pressed on one lateral wall of the stopper recess 7b. As the result, the turntable 2 is prevented from rotation relative to the base 7. When the rotation stopper operation member 21 is rotated in a reverse direction, the threaded part 22a is moved forwardly relative to the nut part 23a, so that the rotation stopper member 25 is released not to be pushed by the rotation stopper rod 22. As the result, rotation stopper member 25 is released not to be pressed on the lateral wall of the stopper recess 7b, so that the turntable 2 is free to rotate.

As described above, with the slide stopper mechanism 10 of this embodiment, the operation for fixing the position of the miter saw unit 4 in the sliding direction can be performed by rotating the slide stopper operation member 11 which is positioned on the side of the front wall 2C of the turntable 2 or the front side as viewed from the operator. Therefore, the operator is not required to reach out his hand to the rear side of a miter saw unit and to grope for an operation knob as required in the conventional circular saw. Therefore, the operability of the circular saw 1 can be remarkably improved.

In addition, with this embodiment, the slide stopper operation member 11 of the slide stopper mechanism 10 and the rotation stopper operation member 21 of the rotation stopper mechanism 20 are disposed coaxially with each other. Further, the slide stopper rod 13 is disposed coaxially with the rotation stopper rod 22. Therefore, the slide stopper mechanism 10 and the rotation stopper mechanism 20 can be arranged within a relatively small space between the turntable 2 and the base 7 as in this embodiment.

Figure 6:
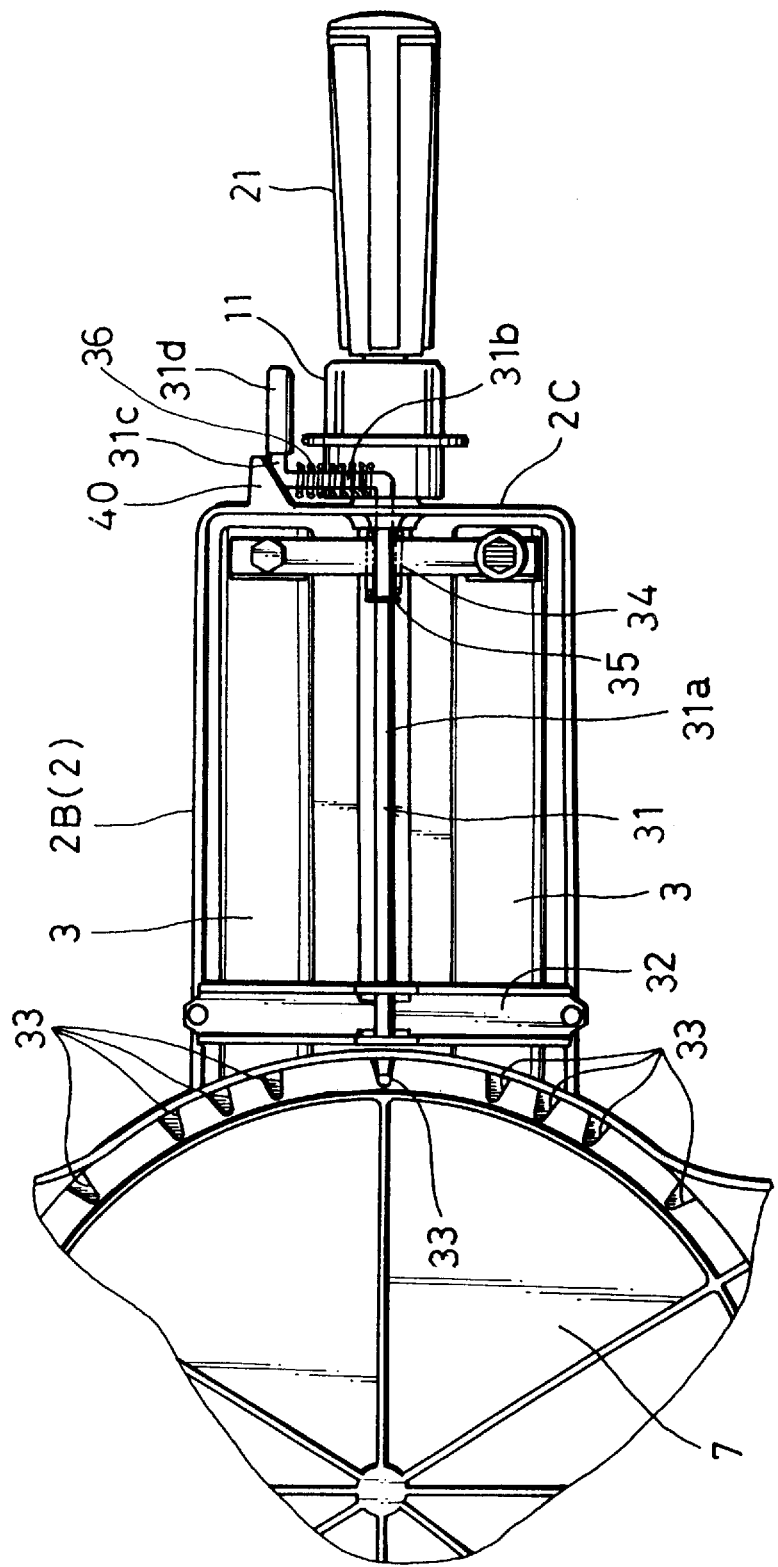
FIG. 6 is a bottom view of the extension.
Figure 7:
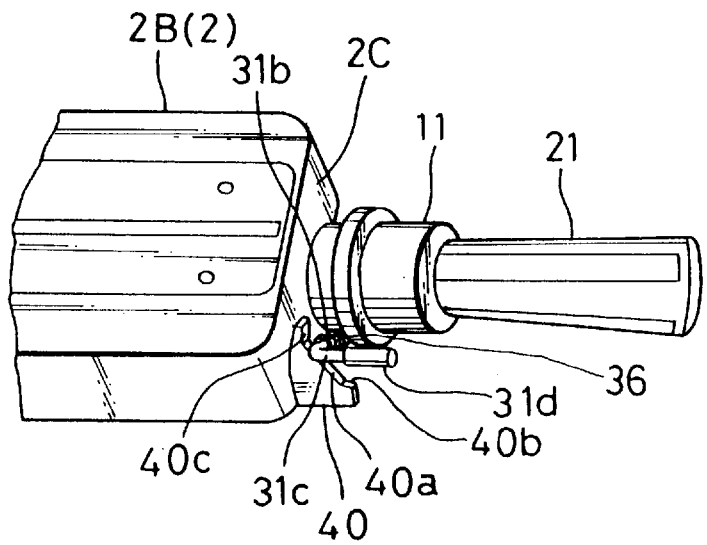
FIG. 7 is a perspective view of a front part of the extension and showing operation members of a slide stopper mechanism, a rotation stopper mechanism and a rotation lock mechanism.

A rotation lock mechanism 30 for fixing the turntable 2 at any of predetermined rotational positions will now be explained. As shown in FIGS. 3 and 6, the rotation lock mechanism 30 includes a rotation lock operation member 31 having a rod-like part 31a formed integrally therewith. The rod-like part 31a extends between the front wall 2C of the extension 2B of the turntable 2 and a pin holder 32 mounted on the extension 2B in a position adjacent the rear end thereof, so that the rod-like part 31a is rotatable and axially movable relative to the turntable 2.

Figure 5:
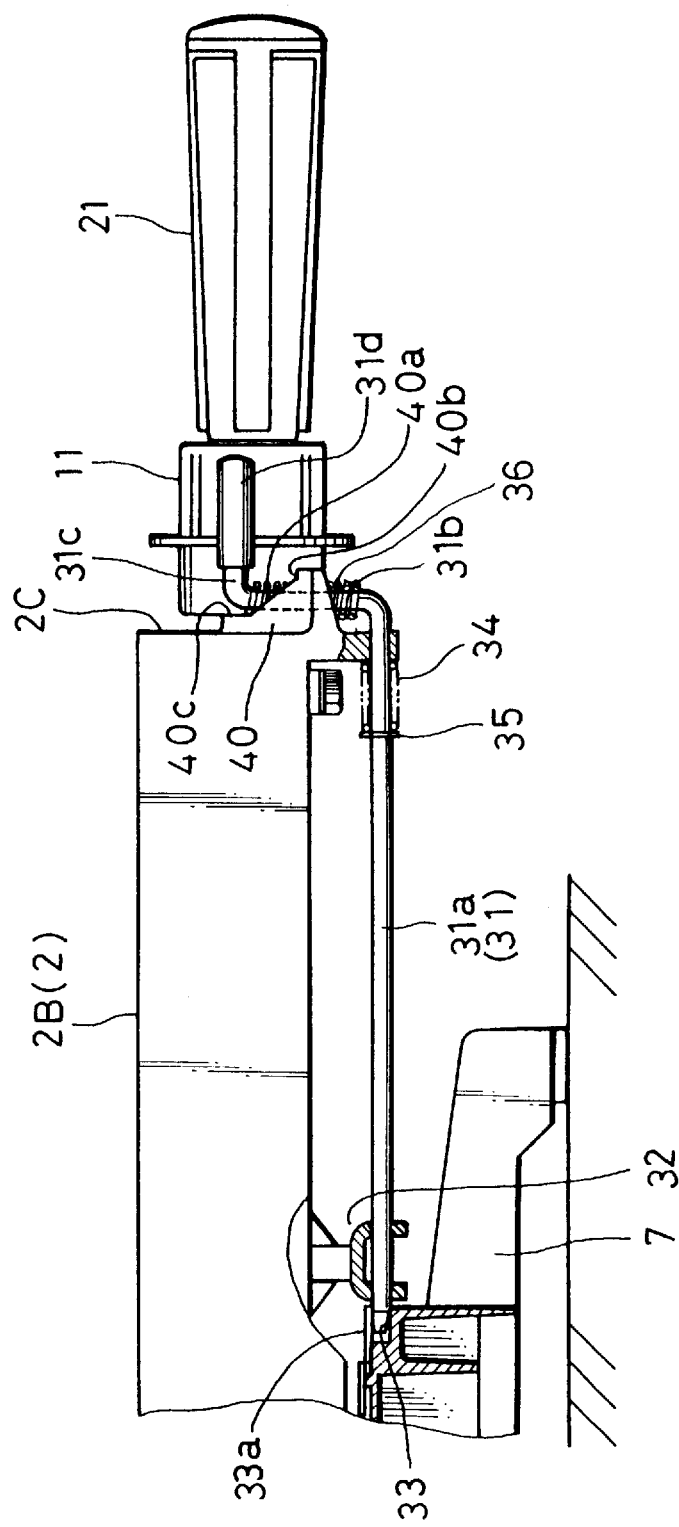
FIG. 5 is a side view of an extension of the turntable.

As shown in FIG. 5, a plurality of lock holes 33 are formed in an upper surface of a front portion of the base 7. The lock holes 33 are adapted to receive a rear end (left end as viewed in FIG. 5) of the rod-like part 31a. As shown in FIG. 6, the lock holes 33 are arranged along a part of a circle about the rotational axis of the turntable 2 and are spaced from each other by a suitable distance. As shown in FIG. 2, the upper opening of each of the lock holes 33 is closed by a scale plate 33a which serves to indicate the rotational position of the turntable 2.

A stopper ring 35 is mounted on the rod-like part 31a in a position adjacent the front wall 2C of the extension 2B. A compression spring 34 is fitted on the rod-like part 31a and is interposed between the stopper ring 35 and the front wall 2C, so that the rotation lock operation member 31 is normally biased in a direction toward the base 7 (leftwardly as viewed in FIG. 5) for inserting the rod-like part 31a into any one of the lock holes 33.

The rod-like part 31a extends forwardly through the front wall 2C of the turntable 2, and a first bent part 31b has one end connected to the front end of the rod-like part 31a and extends at substantially right angles relative to the rod-like part 31a. A second bent part 31c is bent at substantially right angles from the other end of the first bent part 31b and extends substantially parallel to the rod-like part 31a. The first and second bent parts 31b and 31c form a rotation lock operation part which has a crank-like configuration and is adapted to be pivoted by the operator as will be explained later.

A coil spring 36 is fitted on the first bent part 31b and serves as a rolling member as will be explained later. A cap 31d is fitted on the second bent part 31c. The inner diameter and the non-loaded length of the coil spring 36 are determined such that the coil spring 36 can freely and smoothly rotate about the first bent part 31b.

Figure 8:
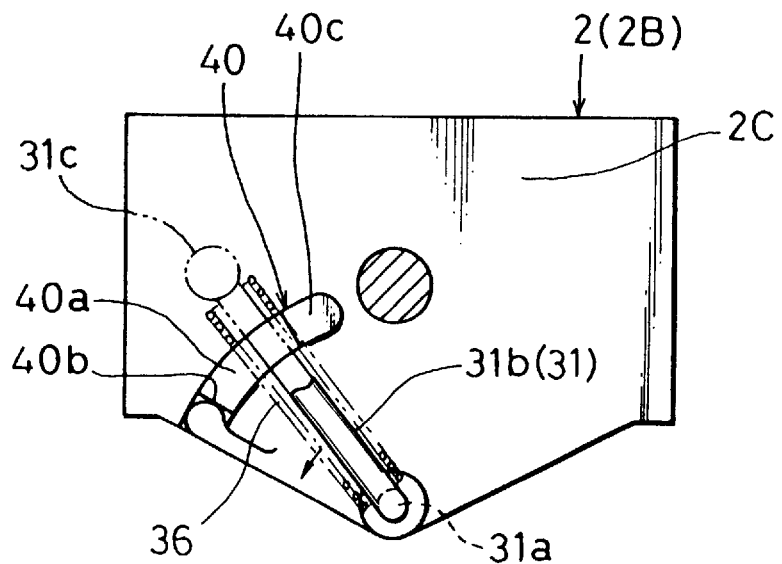
FIG. 8 is a front view of a front wall of the extension.

A protrusion 40 is formed integrally with the front wall 2C of the extension 2B and is positioned on the lateral side of the first bent part 31b of the rotation lock operation member 31. The protrusion 40 serves to provide a guide for the rotation lock operation member 31 and includes an inclined surface 40a on which the first bent part 31b of the rotation lock operation member 31 slidably abuts by means of the coil spring 36. The inclined surface 40a is inclined downwardly in the forward direction (right direction as viewed in FIG. 5) or the direction of removal of the rod-like part 31a from the lock holes 33. As is best seen from FIG. 8, the protrusion 40 has an arcuate configuration about the axis of the rod-like part 31b of the rotation lock operation member 31 as viewed from the front side of the front wall part 2C, so that the inclined surface 40a also has an arcuate configuration about the axis of the rod-like part 31a.

An upper stopper surface 40c is formed at the upper end of the inclined surface 40a in continuity therewith and extends substantially perpendicular to the axis of the rod-like part 31b. On the other hand, a lower stopper surface 40b is formed at the lower end of the inclined surface 40a in continuity therewith and extends substantially in parallel to the axis of the rod-like part 31b. The position of the lower stopper surface 40b is determined such that the first bent part 31b of the rotation lock operation member 31 is brought to abut on the lower stopper surface 40b by means of the coil spring 36 when the rod-like part 31a is completely removed from one of the lock holes 33 or when the rotation lock mechanism 30 is released to permit rotation of the turntable 2.

As described above, the rotation lock operation member 31 is normally biased by the compression spring 34 in a direction for insertion into the lock holes 33. Therefore, when the turntable 2 is rotated to a position where the rod-like part 31a confronts any one of the lock holes 33, the rod-like part 31a is forced to be inserted into this one of the lock holes 33, so that the turntable 2 is fixed in position in the rotational direction. When the rod-like part 31a is thus inserted into the lock hole 33, the first bent part 31b is brought to abut on the upper stopper surface 40c.

Although in the above embodiment, the movement of the rotation lock operation member 31 is limited in the rearward direction or the direction for insertion into the lock holes 33 through abutment of the first bent part 32b on the upper stopper surface 40c, such a movement may be limited through abutment of the rod-like part 31a on the bottom of the lock hole 33, so that the upper stopper surface 40c can be omitted.

In order to move the rotation lock operation member 31 from a fixing position where the rod-like part 31a is in engagement with any one of the lock holes 33 to a releasing position where the rod-like part 31a is removed from the lock holes 33, the operator pushes the second bent part 31c downwardly with his fingers, so that the first bent part 31b is pivoted downwardly about the axis of the rod-like part 31a while the first bent part 31b slidably abuts the inclined surface 40a by means of the coil spring 36. Since the coil spring 36 is rotatable about the first bent part 31b during the pivotal movement of the first bent part 31b, the first bent part 31b can smoothly contact the inclined surface 40a without receiving substantial frictional resistance from the inclined surface 40a.

As the first bent part 31b is thus pivoted relative to the inclined surface 40a, the first bent part 31b is also moved forwardly in the axial direction of the rod-like part 31a against the biasing force of the compression spring 34. When the first bent part 31b is pivoted to abut on the lower stopper surface 40b, the rod-like part 31a is completely removed from the lock hole 33, and the first bent part 31b cannot be pivoted further. The rotation lock operation member 31 is thus moved to the releasing position.

In order to move the rotation lock operation member 31 from the releasing position to the fixing position, the operator releases the second bent part 31c with the turntable 2 positioned at a position where the rod-like part 31a confronts any one of the lock holes 33. Since the rotation lock operation member 31 is biased in the rearward direction by the compression spring 34, the rotation lock operation member 31 is automatically moved rearwardly while it is pivoted upwardly through movement of the first bent part 31b along the inclined surface 40a, so that the rod-like part 31a is brought to enter the lock hole 33. As the result, the turntable 2 is fixed in the rotational direction.

When the rotation lock operation member 31 is moved to the fixing position as described above, the first bent part 31b slidably abuts on the inclined surface 40a while the coil spring 36 is rotated on the inclined surface 40a, so that the first bent part 31b does not receive substantial frictional resistance from the inclined surface 40a.

With the rotation lock mechanism 30 as described above, the rotation lock operation member 31 can be moved from the releasing position to the fixing position by pushing the second bent part 31c downwardly. Such a pushing operation can be easily performed by the operator in comparison with an operation required for a conventional rotation lock mechanism or an operation for axially pulling a rotation lock operation member. Therefore, the rotation lock mechanism 30 of this embodiment is excellent in operability.

In addition, with the conventional rotation lock mechanism, the operator cannot recognize the timing when a fixing state is released by the pulling operation, so that the conventional rotational lock mechanism involves a problem in this respect. In contrast, with the rotation lock mechanism 30 of this embodiment, the rotation lock operation member 31 is completely removed from the lock holes 33 when the first bent part 31b is brought to abut on the lower stopper surface 40b and is prevented from further downward movement. Therefore, the operator can clearly recognize the timing when the rotation lock operation member 31 is released. The rotation lock mechanism 30 of this embodiment is excellent in operability also in this respect.

Further, with this embodiment, the first bent part 31b does not directly contact the inclined surface 40a but contacts the same by means of the coil spring 36 which can be smoothly rotated about the first bent part 31b. Therefore, the first bent part 31b can be smoothly slidably moved along the inclined surface 40a, so that the operator requires a relatively small force for pivotally moving the rotation lock operation member 31.

In addition, since the coil spring 36 is resiliently deformable, the coil spring 36 can be easily fitted on the first bent part 31b through the second bent part 31c which is bent perpendicular to the first bent part 31b. This means that the coil spring 36 can be fitted on the first bent part 31b even after the rotation lock operation member 31 has been bent to form the first and second bent parts 31b and 31c, and that the provision of the coil spring 36 does not cause any difficulties in mounting the rotation lock operation member 31 on the circular saw 1. Further, the coil spring 36 can be easily removed from the rotation lock operation member 31 by removing the cap 31d from the second bent part 31c, so that a maintenance work such as a cleaning work and an exchanging work of the coil spring 36 can be easily performed.

Furthermore, since the first and second bent parts 31b and 31c which constitute the rotation lock operation part of the rotation lock operation member 31 are positioned on the front side of the front wall 2C of the extension 2B, three kinds of different operation members comprising the slide stopper operation member 11 of the slide stopper mechanism 10, the rotation stopper operation member 21 of the rotation stopper mechanism 20 and the rotation lock operation member 31 of the rotation lock mechanism 30 are concentrated on the front side of the front wall 2C. Therefore, the operator can operate any of these operation members without changing his position and he can operate any one of the operation members while grasping the other one of the operation members with his hand. This embodiment is excellent in operability in this respect.

The above concentrated arrangement of the operation members of this embodiment can be also applied to a circular saw of the type having a slide mechanism disposed between a miter saw unit and a pivotal support portion which is laterally pivotally supported on a turntable.

The above embodiment may be modified in various manners.

For example, the slide stopper member 14 may be mounted on the turntable 2 such that the stopper member 14 is movable in a radial direction of the slide rod 3, and the stopper member 14 and the slide stopper rod 13 may have cam surfaces which cooperate with each other to the effect that the stopper member 14 is moved to be pressed on the slide rod 3 when the slide stopper rod 13 is moved axially rearwardly.

Figure 9A:
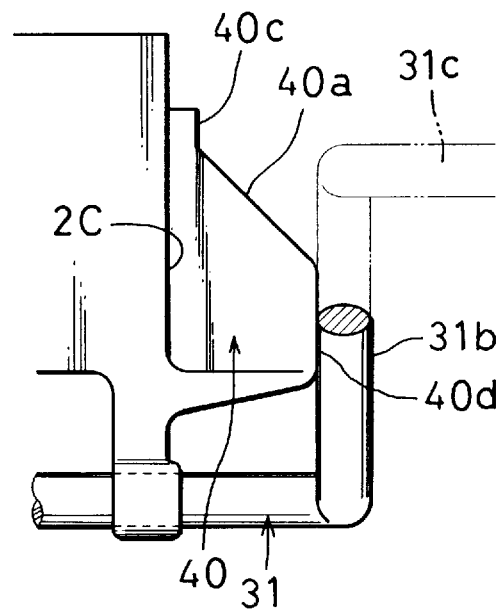
FIG. 9(A) is a side view of the front part of the extension and showing a modification of a protrusion formed on the front wall of the extension.
Figure 9B:
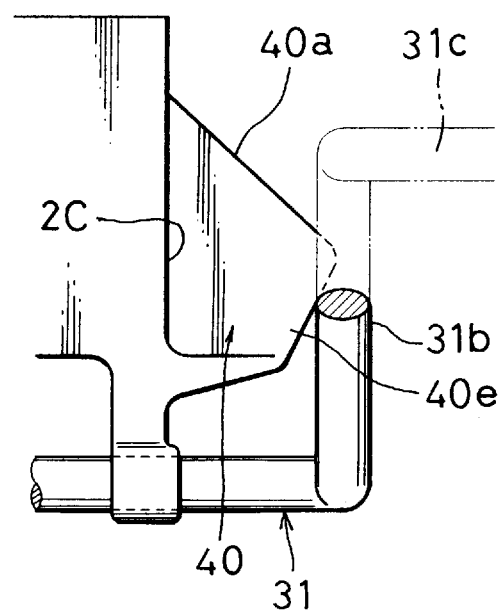
FIG. 9(B) is a side view similar to FIG. 9(A) but showing a different modification.

With regard to the rotation lock mechanism 30, although in the above embodiment, the lower stopper surface 40b is formed in continuity with the inclined surface 40a so as to prevent the second bent part 31c from being further moved downwardly when the rotation lock operation member 31 is completely removed from the lock hole 33, the lower stopper surface 40b may be replaced by an unlock holding portion for preventing the second bent part 31c from returning upwardly. Such an unlock holding portion may be a vertical surface 40d which is formed in continuity with the inclined surface 40a and which extends substantially perpendicular to the axis of the rod-like part 31a of the rotation lock operation member 31 as shown in FIG. 9(A). Otherwise, such an unlock holding portion may be an inversely inclined surface 40e which is formed in continuity with the inclined surface 40a and which is inclined inversely to the inclined surface 40a or is rearwardly downwardly inclined as shown in FIG. 9(B). For convenience of illustration, the coil spring 36 is omitted in FIGS. 9(A) and 9(B).

In addition, although in the above embodiment, the rotation lock operation member 31 includes the first bent part 31b and the second bent part 31c, the second bent part 31c may be eliminated.

Further, although the inclined surface 40a is inclined forwardly downwardly, the inclined surface 40a may be inclined forwardly upwardly, so that the rotation lock operation member 31 is removed from the lock hole 33 by pushing the second bent part 31 upwardly.

Furthermore, the coil spring 36 may be replaced by any other kind of rolling members such as a sleeve made of rubber or plastic. Thus, various rolling members may be used as long as they are resiliently deformable for fitting on the first bent part 31b through the second bent part 31c and have cylindrical configurations for smooth rolling movement along the inclined surface 40a.

The construction of the rotation lock operation member 31 and its associated protrusion 40 may be broadly applied to operation mechanisms of any other kind of table devices such as a turntable device and an indexing table device which are used for other purpose than cutting and which have operation members adapted to be pivoted along parts of the devices for axial movement of the operation members.

While the invention has been described with reference to a preferred embodiment thereof, it is to be understood that modifications or variations may be easily made without departing from the spirit of this invention which is defined by the appended claims.

What is claimed is:

1. A circular saw comprising:
   a table for placing a work to be cut thereon; and
   a saw unit slidably supported on said table by means of a slide mechanism; and
   a slide stopper mechanism adapted for fixing said saw unit in position in a sliding direction and having a slide stopper operation member;
   said slide mechanism including a slide support member, said slide support member being slidably supported on said table and having a longitudinal axis;
   said saw unit being positioned on a first side of said table where said saw unit is vertically pivotally mounted on one end of said slide support member;
   said slide stopper operation member being positioned on and operable from a second side of said table opposite to said first side, said second side being the side where an operator is positioned for operation of the saw unit.

2. In a circular saw having a table for placing a work to be cut thereon, a base for rotatable supporting the table and a saw unit slidably supported on the table by means of a slide mechanism, the improvement comprising:
   a slide stopper mechanism selectively fixing the saw unit in position in a sliding direction; and
   a rotation stopper mechanism for fixing a rotational position of the table relative to the base;
   said slide stopper mechanism and said rotation stopper mechanism including a slide stopper operation member and a rotation stopper operation member for operation by an operator, respectively;
   said slide stopper operation member and said rotation stopper operation member being disposed adjacent a front portion of the table whereat the operator operates the saw unit, and being positioned adjacent each other.

3. The circular saw as defined in claim 2 wherein said slide mechanism includes a slide support member fixed to the saw unit and slidably supported on the table, and wherein said slide stopper mechanism includes a slide stopper member actuated through operation of said slide stopper operation member and movable between a fixing position pressing on said slide support member and a releasing position released from pressing on said slide support member.

4. The circular saw as defined in claim 3 wherein said slide stopper mechanism further includes a slide stopper rod interposed between said slide stopper member and said slide stopper operation member and movable relative to the table in an axial direction, so that said slide stopper member is pivoted between said fixing position and said releasing position when said slide stopper operation member is rotated by the operator.

5. The circular saw as defined in claim 1 further including a rotation lock mechanism for fixing the table in any of plurality of predetermined rotational positions, said rotation lock mechanism having a rotation lock operation member disposed adjacent the front portion of the table and adjacent both said slide stopper operation member and said rotation stopper operation member.

6. In a circular saw having a table for placing a work to be cut thereon and having a saw unit slidably supported on the table by means of a slide mechanism, the improvement comprising:

a slide stopper mechanism selectively fixing the saw unit in position in a sliding direction and having a slide stopper operation member disposed adjacent a front portion of the table whereat an operator who operates the saw unit is positioned, said slide mechanism including a slide support member fixed to the saw unit and slidably supported on the table, and wherein said slide stopper mechanism includes a slide stopper member actuated through operation of said slide stopper operation member and movable between a fixing position pressing on said slide support member and a releasing position released from pressing on said slide support member, said slide stopper mechanism further including a slide stopper rod interposed between said slide stopper member and said slide stopper operation member and movable relative to the table in an axial direction, so that said slide stopper member is pivoted between said fixing position and said releasing position when said slide stopper operation member is rotated by the operator, said slide stopper rod being positioned parallel to said slide support member, and wherein said slide stopper member has a pivotal axis in a direction perpendicular to an axis of said slide stopper rod.

7. In a circular saw having a table for placing a work to be cut thereon and having a saw unit slidably supported on the table by means of a slide mechanism, the improvement comprising:

a slide stopper mechanism selectively fixing the saw unit in position in a sliding direction and having a slide stopper operation member disposed adjacent a front portion of the table whereat an operator who operates the saw unit is positioned, said slide mechanism including a slide support member fixed to the saw unit and slidably supported on the table, and wherein said slide stopper mechanism includes a slide stopper member actuated through operation of said slide stopper operation member and movable between a fixing position pressing on said slide support member and a releasing position released from pressing on said slide support member, said slide stopper mechanism further including a slide stopper rod interposed between said slide stopper member and said slide stopper operation member and movable relative to the table in an axial direction, so that said slide stopper member is pivoted between said fixing position and said releasing position when said slide stopper operation member is rotated by the operator, a base for rotatably supporting the table and a rotation stopper mechanism for fixing a rotational position of the table relative to said base, said rotation stopper mechanism including:

a rotation stopper operation member disposed adjacent the front portion of the table and adjacent said slide stopper operation member;

a rotation stopper member actuated through operation of said rotation stopper operation member and movable between a pressing position for pressing on said base and a releasing position for not pressing on said base; and a rotation stopper rod interposed between said rotation stopper member and said rotation stopper operation member and slidably movable in an axial direction relative to the table;

said slide stopper rod and said rotation stopper rod being coaxially positioned, and one of said slide stopper rod and said rotation stopper rod having a sleeve-like configuration for axially slidably receiving the other.

8. The circular saw as defined in claim 7 wherein said rotation stopper rod is slidably received within said slide stopper rod, and wherein said slide stopper operation member has a tubular configuration through which said rotation stopper rod extends.

9. In a circular saw having a table for placing a work to be cut thereon and having a saw unit slidably supported on the table by means of a slide mechanism, the improvement comprising:

a slide stopper mechanism selectively fixing the saw unit in position in a sliding direction and having a slide stopper operation member disposed adjacent a front portion of the table whereat an operator who operates the saw unit is positioned, a base for rotatably supporting the table and a rotation lock mechanism for fixing a rotational position of the table relative to said base, said rotation lock mechanism including:

a rotation lock operation member for rotation by the operator, said rotation lock operation member having;

a rotation lock rod slidably movable in an axial direction relative to the table for fixing the table in position relative to said base and for releasing the same; and motion conversion means provided between said rotation lock operation member and the front portion of the table for converting the rotation of said rotation lock operation member into the axial movement of said rotation lock operation member.

10. The circular saw as defined in claim 9 wherein said rotation lock mechanism is operable to fix the table relative to said base at any one of predetermined rotational positions, and wherein said base has a plurality of lock holes formed therein and spaced from each other in a circumferential direction about said base, so that said rotation lock rod is insertable into any one of said lock holes for fixing the rotational position of the table.

11. The circular saw as defined in claim 10 wherein said motion conversion means includes an inclined surface on the front portion of the table and inclined relative to the axis of said rotation lock rod, an abutting portion on said rotation lock operation member for abutment on said inclined surface, wherein an abutting position of said abutting portion on said inclined surface is varied along said inclined surface when said rotation lock operation member is rotated by the operator.

12. The circular saw as defined in claim 11 further including stopper means provided on one end of said inclined surface, said stopper means being operable to prevent said rotation lock operation member from being rotated further when said rotation lock rod has been moved away from said base to a position where said rotation lock rod is completely removed from a corresponding lock hole.

13. The circular saw as defined in claim 12 wherein said stopper means is a stopper surface formed in continuity with one end of said inclined surface for abutment of said rotation lock operation member in a rotated position wherein said rotation lock rod is completely removed from a corresponding lock hole.

14. The circular saw as defined in claim 11 further including unlock holding means for preventing said rotation lock operation member from returning in a reverse direction after said rotation lock rod has been moved away from said base to a position where said lock rod is completely removed from a corresponding lock hole.

15. The circular saw as defined in claim 14 wherein said unlock holding means is a holder surface formed in continuity with one end of said inclined surface and extends substantially perpendicular to the axis of said rotation lock rod.

16. The circular saw as defined in claim 11 wherein said rotation lock operation member has a bent part extending from one end of said rotation lock rod in a direction substantially perpendicular to the axis of said rotation lock rod, and wherein said bent part includes said abutting portion.

17. The circular saw as defined in claim 16 further including biasing means for biasing said rotation lock rod, so that said abutting portion of said rotation lock operation member is forced to abut on said inclined surface.

18. In a circular saw having a table for placing a work to be cut thereon and having a saw unit slidably supported on the table by means of a slide mechanism, the improvement comprising:

a slide stopper mechanism selectively fixing the saw unit in position in a sliding direction and having a slide stopper operation member disposed adjacent a front portion of the table whereat an operator who operates the saw unit is positioned, a base for rotatably supporting the table and a rotation lock mechanism for fixing a rotational position of the table relative to said base, said rotation lock mechanism including:

a rotation lock operation member adapted to be rotated by the operator; and motion conversion means provided between said rotation lock operation member and the table for converting rotation of said rotation lock operation member into an axial movement of the same;

said motion conversion means including an inclined surface provided on the table, an abutting portion provided on said rotation lock operation member for abutment on said inclined surface wherein an abutting position of said abutting portion on said inclined surface is varied along said inclined surface when said rotation lock operation member is rotated by the operator.

19. The circular saw as defined in claim 18 including a rolling member on said abutting portion for smooth movement of said abutting portion along said inclined surface.

20. The circular saw as defined in claim 19 wherein said rolling member is flexibly deformable and encircles said abutting portion.

* * * * *